(12) United States Patent
King et al.

(10) Patent No.: US 7,680,034 B2
(45) Date of Patent: Mar. 16, 2010

(54) REDUNDANT CONTROL SYSTEMS AND METHODS

(75) Inventors: Dennis Brian King, Roanoke, VA (US); John N. Cunningham, Roanoke, VA (US); Fred Henry Boettner, Roanoke, VA (US); Mark E. Shepard, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 487 days.

(21) Appl. No.: 11/592,379

(22) Filed: Nov. 3, 2006

(65) Prior Publication Data

US 2008/0125886 A1 May 29, 2008

(51) Int. Cl.
*H04L 1/22* (2006.01)

(52) U.S. Cl. .......................................... 370/228; 714/11
(58) Field of Classification Search ................. 370/216, 370/217, 220, 225, 228; 714/1, 10, 11, 12, 714/13
See application file for complete search history.

(56) References Cited

U.S. PATENT DOCUMENTS

| | | | | |
|---|---|---|---|---|
| 4,351,023 A | * | 9/1982 | Richer | 700/82 |
| 4,583,224 A | * | 4/1986 | Ishii et al. | 714/10 |
| 5,613,064 A | * | 3/1997 | Curtin | 714/47 |
| 5,953,314 A | * | 9/1999 | Ganmukhi et al. | 370/220 |
| 6,061,809 A | * | 5/2000 | Glaser et al. | 714/11 |
| 6,591,150 B1 | * | 7/2003 | Shirota | 700/82 |
| 6,868,309 B1 | * | 3/2005 | Begelman | 700/273 |
| 2003/0140270 A1 | * | 7/2003 | Lehmann | 714/6 |
| 2006/0221817 A1 | * | 10/2006 | Nishida et al. | 370/216 |

\* cited by examiner

*Primary Examiner*—Min Jung
(74) *Attorney, Agent, or Firm*—Ohlandt, Greeley, Ruggiero & Perle, L.L.P.

(57) ABSTRACT

A redundant control system for controlling an electromechanical system is provided. The control system includes a first processor, a second processor, an input-output node, a first communication channel, a second communication channel, and a signal selector. The first and second processors have a control algorithm and state variables resident thereon. The first and second processors each generate an output signal based on the control algorithm, the state variables, and an input signal from the electromechanical system. The first communication channel communicates the input signal and the output signal between the first processor and the input-output node, while the second communication channel communicates the input signal and the output signal between the second processor and the input-output node. The signal selector communicates either the output signal from the first processor or the output signal from the second processor to the electromechanical system.

19 Claims, 1 Drawing Sheet

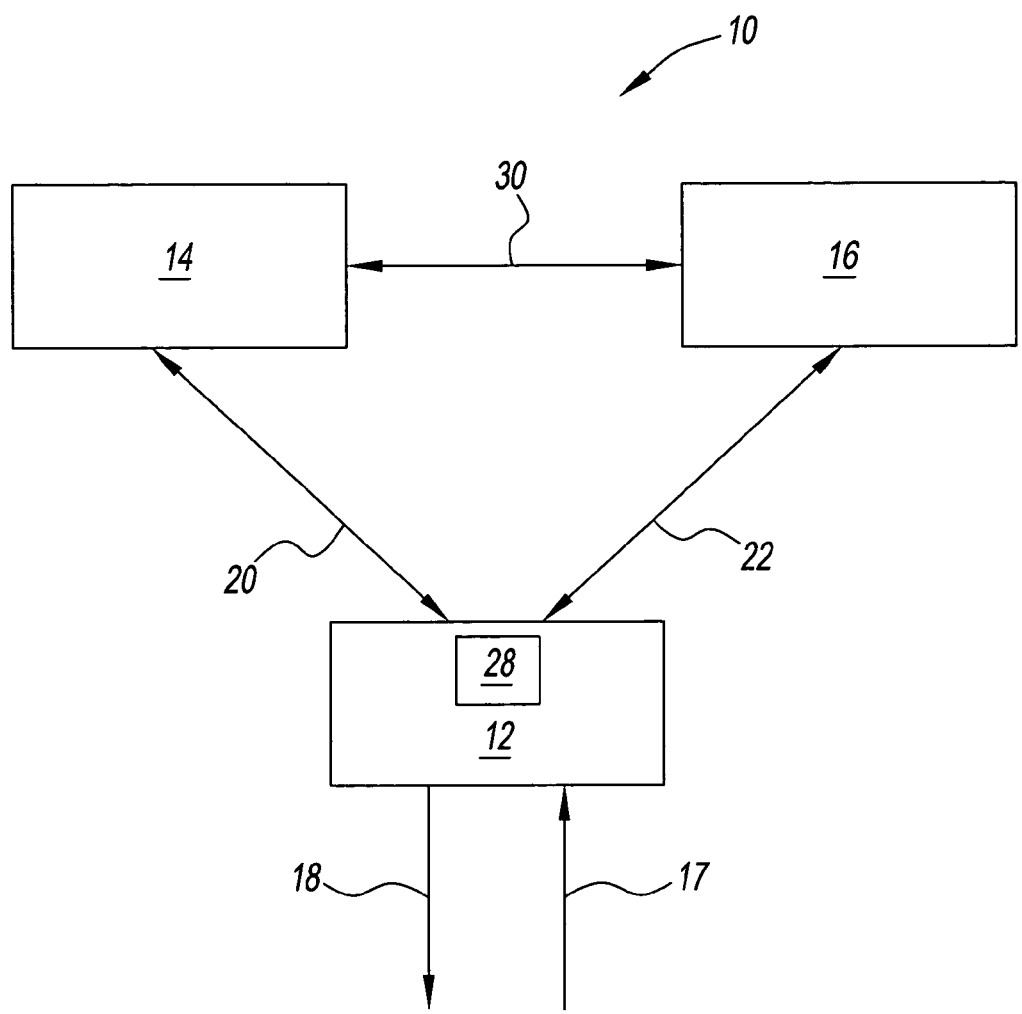

REDUNDANT CONTROL SYSTEMS AND METHODS

BACKGROUND OF INVENTION

The present disclosure relates to control systems. More particularly, the present disclosure relates to redundant control systems and methods.

Complex electromechanical systems such as, but not limited to power generators and industrial co-generators, require a control systems that operate the various components of the electromechanical system. Such control systems include a processor that guides the actions of the electromechanical system. In the event of a failure of the processor, the entire electromechanical system fails.

The reliability of a control system is directly related to the level of redundancy in the components in the control system. Thus, it has been proposed to use two or more, redundant processors with such electromechanical systems in order to improve the reliability of the control system.

Prior art control systems having two processors have typically been implemented using a primary/secondary hierarchy. In this hierarchy, the secondary processor serves as a backup processor to the primary processor. When a failure of the primary processor occurs, the control system must first detect the failure, then must switchover control of the electromechanical system to the secondary processor. The time required for failure detection can result in control interruptions. In addition, the switchover often requires re-routing of input and/or output packets from the primary processor to the secondary processor, which can also result in control interruptions.

Thus, dual redundant control systems using primary/secondary hierarchy unfortunately result in control interruptions, which can negatively effect the operation of high-speed control loops.

Accordingly, it has been determined that there is a need for redundant control systems that overcome, mitigate and resolve one or more of the above and other deleterious effects of prior art dual redundant control systems.

BRIEF DESCRIPTION OF THE INVENTION

It is an object of the present disclosure to provide a redundant control system that eliminates the effects of a processor failure on the electromechanical system being controlled.

A redundant control system for controlling an electromechanical system is provided. The control system includes a first processor, a second processor, a communication node, a first communication channel, a second communication channel, and a signal selector. The first and second processors have a control algorithm and state variables resident thereon. The first and second processors each generate an output signal based on the control algorithm, the state variables, and one or more input signals from the electromechanical system. The first communication channel communicates the one or more input signals and the output signal between the first processor and the communication node, while the second communication channel communicates the one or more input signals and the output signal between the second processor and the communication node. The signal selector communicates either the output signal from the first processor or the output signal from the second processor to the electromechanical system.

Methods of redundantly controlling an electromechanical system are also provided.

The method can include receiving an input signal from the electromechanical system at an communication node; sending the input signal from the communication node to a first processor via a first communication channel; sending the input signal from the communication node to a second processor via a second communication channel, the first and second processors having the same control algorithm and state variables resident thereon; determining an output signal in each of first processor and the second processor based on the input signal, the control algorithm, and the state variables; sending the output signal from the first processor to the communication node; sending the output signal from the second processor to the communication node; selecting between the output signal from the first processor or the output signal from the second processor; and sending the selected output signal from the communication node to the electromechanical system.

The method can also include running a control algorithm and a plurality of state variables for controlling the electromechanical system on a first processor and a second processor; communicating an input signal from the electromechanical system to an communication node; communicating the input signal from the communication node to the first processor and the second processor; determining an output signal at the first processor and at the second processor based on the control algorithm, the plurality of state variables, and the input signal; and determining whether to use the output signal from the first processor or the output signal from the second processor for controlling the electromechanical system.

The above-described and other features and advantages of the present disclosure will be appreciated and understood by those skilled in the art from the following detailed description, drawing, and appended claims.

BRIEF DESCRIPTION OF THE DRAWINGS

The single FIGURE illustrates a schematic depiction of an exemplary embodiment of a redundant control system according to the present disclosure.

DETAILED DESCRIPTION OF THE INVENTION

Referring to the single drawing, an exemplary embodiment of a redundant control system according to the present disclosure is illustrated by way of reference numeral 10. Redundant control system 10 includes one or more communication nodes 12 (only one shown), a first processor 14, and a second processor 16.

First and second processors 14, 16 have identical control algorithms and state variables resident thereon for control of an electromechanical system (not shown). In use, control system 10 designates one of processors 14, 16 as a master processor and designates the other processor 14, 16 as a subordinate processor. After each sequential execution of the control algorithm, the state variables resident on processors 14, 16 are updated. For example, the master processor can jam or download its state variables onto the subordinate processor.

Advantageously, redundant control system 10 ("control system") provides for seamless transfer of control between the first and second processors 14, 16. In this manner, control outputs from control system 10 to the electromechanical system do not experience any transients or other disturbances or delay caused by the transfer of control between the processors 14, 16. Thus, control system 10 can assign either processor 14, 16 as the master processor.

Communication node 12 ("node") can be a terminal board with a processor or other logic circuit configured for communicating between the electromechanical system and processors 14, 16. Thus, node 12 receives an input signal 17 from the electromechanical system and sends an output signal 18 to the electromechanical system.

Node 12 is also in electrical communication with both first and second processors 14, 16 so that the processors can generate output signal 18.

Thus, node 12 sends input signal 17 to each processor 14, 16 and receives output signal 18 from each processor 14, 16. The output signal 18 generated by the each processor 14, 16 is identical to one another since they are based on identical input signal 17, processed by identical control algorithms and state variables.

In the illustrated embodiment, control system 10 includes a first communication channel 20 placing node 12 and first processor 14 in electrical communication with one another and a second communication channel 22 placing the node and second processor 16 in electrical communication with one another. The first and second communication channels 20, 22 can be on the same and/or different networks. In some embodiments, communication channels 20, 22 can have different Ethernet addresses on the same network. In other embodiments, channels 20, 22 can be on different networks. In still other embodiments, control system 10 can include two different networks, each including multiple communication channels thereon.

First communication channel 20 communicates input signal 17 from node 12 to first processor 14 and communicates output signal 18 from the first processor 14 to the node 12. Similarly, second communication channel 22 communicates input signal 17 from node 12 to second processor 16 and communicates output signal 18 from the second processor 16 to the node 12. Since first and second processors 14, 16 have the identical control algorithms and state variables resident thereon, the output signals 18 from both processors are identical to one another.

Processors 14, 16 execute the control algorithm each time they receive input signals 17 from node 12. Control system 10 has a frame rate. As used herein, the term "frame rate" is defined as the rate at which the control cycle is completed. The control cycle includes the sampling of inputs 17 by node 12, communication of the inputs 17 by the node to processors 14, 16, the processing of the input signals 17 through the control algorithm at the processors, the sending of the output signals 18 back to the node, and the exchange of state variables between processors.

Control system 10 includes a signal selector 28 that determines whether to send the output signals 18 from the first processor 14 or from the second processor 16 to the electromechanical system.

In the illustrated embodiment, communication node 12 is an input-output node having signal selector 28 is resident on the node. Of course, it is contemplated by the present disclosure for communication node 12 to have an input-only portion (not shown) and a separate output-only portion (not shown). Here, the input-only portion and the output-only portion are each in electrical communication with the electromechanical system and with signal selector 28.

In a first embodiment of the present disclosure, the signal selector 28 can randomly select between the output signals 18 from the first processor 14 or the second processor 16. Specifically, the signal selector 28 can randomly select between the output signals 18 from the first processor 14 or the second processor 16 when the signal selector 28 has received the output signals from both processors. However, when the output signals 18 is received from only one of the processors 14, 16, the signal selector 28 can select that output signal 18.

In a second embodiment of the present disclosure, signal selector 28 can select between the output signals 18 from the first processor 14 or the second processor 16 on a "continuous first in" basis. Specifically, signal selector 28 can select the output signal 18 that is the first one to be received at each communication cycle of the control system 10. When the output signals 18 is received from only one of the processors 14, 16, that output signal is, by default, the first one received by the signal selector 28 and, thus, the signal selector uses this output signal 18.

In a third embodiment of the present disclosure, signal selector 28 can select between the output signal 18 from first processor 14 or second processor 16 on an "initial first in" basis. Specifically, signal selector 28 can base output signal 18 on whichever output signal (e.g., the output signal of first processor 14 or the output signal of second processor 16) is the first one to be received at the start up of the control system 10. Signal selector 28 then parks on that output signal until such time it is no longer available. When the output signal 18 that signal selector 28 originally parked on is no longer available, the signal selector 28 begins using the output signal from the other processor until such time as it is unavailable.

In each of these embodiments of signal selector 28, control system 10 is advantageously configured so that failure of either first processor 14 and/or first communication channel 20 or second processor 16 and/or second communication channel 22 does not effect the response time of the control system 10.

Control system 10 is configured to maintain the synchronization between first and second processors 14,16, namely to process and transmit input and output signals 17, 18 simultaneously between the processors and node 12. As used herein, the terms "synchronously" and "simultaneously" shall mean any time period that is less than the frame rate of the control system 10.

In one embodiment, control system 10 can send a synchronization signal 30 to keep the state variables synchronized between first processor 14 and second processor 16 and to keep the processors functioning simultaneously. Thus, synchronization signal 30 achieves two separate synchronizations, namely a synchronization of the processing time and a synchronization of the state variables.

For example, first processor 14 can send synchronization signal 30 to second processor 16 at a predetermined periodic rate that is independent of the frame period, but is sufficient to keep the processors 14, 16 aligned (time and state variables) with one another. For example, it is contemplated by the present disclosure for synchronization signal 30 to be sent once every two seconds. Of course, it should be recognized that the present disclosure contemplates sending synchronization signal 30 from second processor 16 to first processor 14 and/or sending the synchronization signal 30 to both the first and second processors 14, 16 from an external device (not shown). Preferably, synchronization signal 30 is also sent to node 12 via communication channels 20, 22.

In some embodiments, synchronization signal 30 downloads or jams the state variables from one of the processors 14, 16 to the other processor once per frame after the control algorithms have been run.

In the embodiment where first processor 14 sends synchronization signal 30 to second processor 16, failure of the first processor 14 results in synchronization signal 30 no longer being sent to second processor 16. Upon failure to receive synchronization signal 30, the second processor 16 begins to send synchronization signal 30 to first processor 14. Once first processor 14 is repaired or comes back online, the first processor will continue to receive synchronization signal 30 from second processor 16 until such time as the second processor fails.

Accordingly, control system 10 is configured to ensure that processors 14, 16 simultaneously receive the input signal 17 from node 12, execute simultaneously the same control algorithms on the input signals, and simultaneously send the resultant output signal 18 back to node 12. In addition, control system 10 is configured to ensure that node 12 selects the output signal 18.

It should be recognized that control system 10 is described by way of example as a dual redundant system, namely a control system having two processors 14, 16 each communicating with one node 12 via one communication channel 20, 22. Of course, it is contemplated by the present disclosure for control system 10 to have as many processors as are suitable for a particular application. For example, it is contemplated by the present disclosure for control system 10 to have more than two processors, more than one node, and any combinations thereof. When using more than two processors each additional processor also communicates with node 12 via a communication channel.

In this manner, control system 10 as described herein provides two or more processors 14, 16 looking at the same input signals 17 via independent communication channels 20, 22, where these processors both generate (by processing the input signals through identical control algorithms and state variables) and send identical output signals 18 to the node 12. Advantageously, node 12 includes signal selector 28 that selects, without delay, between the identical output signals received from processors 14, 16.

It should also be noted that the terms "first" and "second" are used herein to modify the various elements of control system 10 such as, but not limited to, the processors, the communication channels, the signals, and the like. However, these modifiers do not imply a spatial, sequential, termporal, and/or hierarchical order of these elements within control system 10.

While the present disclosure has been described with reference to one or more exemplary embodiments, it will be understood by those skilled in the art that various changes may be made and equivalents may be substituted for elements thereof without departing from the scope of the present disclosure. In addition, many modifications may be made to adapt a particular situation or material to the teachings of the disclosure without departing from the scope thereof. Therefore, it is intended that the present disclosure not be limited to the particular embodiment(s) disclosed as the best mode contemplated, but that the disclosure will include all embodiments falling within the scope of the appended claims.

What is claimed is:

1. A redundant control system for controlling an electromechanical system, comprising:
    a first processor having a control algorithm and state variables resident thereon, said first processor generating an output signal based on said control algorithm, said state variables, and an input signal from the electromechanical system;
    a second processor having said control algorithm and said state variables resident thereon, said second processor generating said output signal based on said control algorithm, said state variables, and said input signal;
    a communication node;
    a first communication channel communicating said input signal and said output signal between said first processor and said communication node;
    a second communication channel communicating said input signal and said output signal between said second processor and said communication node; and
    a signal selector communicating either said output signal from said first processor or said second processor to the electromechanical system, wherein said signal selector randomly selects between said output signal from said first processor and said output signal from said second processor.

2. The redundant control system as in claim 1, further comprising a synchronization signal for synchronizing said state variables between said first and second processors.

3. The redundant control system as in claim 2, wherein said synchronization signal is sent by said first processor to said second processor.

4. The redundant control system as in claim 2, wherein said synchronization signal is sent at a predetermined periodic rate.

5. The redundant control system as in claim 1, wherein said communication node comprises a terminal board in electrical communication with the electromechanical system.

6. The redundant control system as in claim 1, further comprising a third processor having said control algorithm and said state variables resident thereon and a third communication channel.

7. The redundant control system as in claim 1, wherein said first and second communication channels are on a common network.

8. The redundant control system as in claim 1, wherein said first and second communication channels are separate networks.

9. The redundant control system as in claim 1, wherein said communication node comprises an input-only portion and an output-only portion, said input-only portion and said output-only portion each being in electrical communication with the electromechanical system and said signal selector.

10. The redundant control system as in claim 1, wherein said communication node comprises an input-output node.

11. The redundant control system as in claim 10, wherein said signal selector is resident on said input-output node.

12. A redundant control system for controlling an electromechanical system, comprising:
    a first processor having a control algorithm and state variables resident thereon, said first processor generating an output signal based on said control algorithm, said state variables, and an input signal from the electromechanical system;
    a second processor having said control algorithm and said state variables resident thereon, said second processor generating said output signal based on said control algorithm, said state variables, and said input signal;
    a communication node;
    a first communication channel communicating said input signal and said output signal between said first processor and said communication node;
    a second communication channel communicating said input signal and said output signal between said second processor and said communication node; and
    a signal selector communicating either said output signal from said first processor or said second processor to the electromechanical system, wherein said signal selector selects between said output signal from said first processor and said output signal from said second processor on a continuous first in basis.

13. The redundant control system as in claim 12, further comprising a synchronization signal for synchronizing said state variables between said first and second processors.

14. The redundant control system as in claim 13, wherein said synchronization signal is sent at a predetermined periodic rate.

15. The redundant control system as in claim 12, wherein said communication node comprises a terminal board in electrical communication with the electromechanical system.

16. A redundant control system for controlling an electromechanical system, comprising:
- a first processor having a control algorithm and state variables resident thereon, said first processor generating an output signal based on said control algorithm, said state variables, and an input signal from the electromechanical system;
- a second processor having said control algorithm and said state variables resident thereon, said second processor generating said output signal based on said control algorithm, said state variables, and said input signal;
- a communication node;
- a first communication channel communicating said input signal and said output signal between said first processor and said communication node;
- a second communication channel communicating said input signal and said output signal between said second processor and said communication node; and
- a signal selector communicating either said output signal from said first processor or said second processor to the electromechanical system, wherein said signal selector selects between said output signal from said first processor and said output signal from said second processor on an initial first in basis.

17. The redundant control system as in claim 16, further comprising a synchronization signal for synchronizing said state variables between said first and second processors.

18. The redundant control system as in claim 17, wherein said synchronization signal is sent at a predetermined periodic rate.

19. The redundant control system as in claim 16, wherein said communication node comprises a terminal board in electrical communication with the electromechanical system.

* * * * *